United States Patent
Hauck et al.

(10) Patent No.: US 12,247,629 B2
(45) Date of Patent: Mar. 11, 2025

(54) CUP ASSEMBLY FOR A UNIVERSAL JOINT BEARING

(71) Applicant: AKTIEBOLAGET SKF, Gothenburg (SE)

(72) Inventors: Helmut Hauck, Euerbach (DE); Hubert Herbst, Gädheim (DE)

(73) Assignee: AKTIEBOLAGET SKF, Gothenburg (SE)

( * ) Notice: Subject to any disclaimer, the term of this patent is extended or adjusted under 35 U.S.C. 154(b) by 544 days.

(21) Appl. No.: 17/526,096

(22) Filed: Nov. 15, 2021

(65) Prior Publication Data

US 2022/0154777 A1    May 19, 2022

(30) Foreign Application Priority Data

Nov. 17, 2020   (DE) .......................... 102020130310.6

(51) Int. Cl.
*F16D 3/38*   (2006.01)
*F16C 33/78*  (2006.01)

(52) U.S. Cl.
CPC .......... *F16D 3/385* (2013.01); *F16C 33/7866* (2013.01); *F16D 2250/0084* (2013.01); *F16D 2300/08* (2013.01); *F16D 2300/12* (2013.01)

(58) Field of Classification Search
CPC ................ F16C 33/7866; F16D 3/385; F16D 2250/0084; F16D 2300/08; F16D 2300/12
USPC .................................................. 464/130, 131
See application file for complete search history.

(56) References Cited

U.S. PATENT DOCUMENTS

| | | | |
|---|---|---|---|
| 6,050,571 A * | 4/2000 | Rieder ..................... | F16D 3/385 464/131 |
| 6,357,754 B1 * | 3/2002 | Rieder ..................... | F16D 3/385 277/394 |
| 9,816,566 B2 * | 11/2017 | Hess ........................ | F16D 3/385 |
| 2018/0340576 A1 | 11/2018 | Khan et al. | |
| 2020/0370604 A1 | 11/2020 | Berruet et al. | |

FOREIGN PATENT DOCUMENTS

| | | | | |
|---|---|---|---|---|
| DE | 3818330 A1 | * | 12/1989 | ............ F16D 3/385 |
| DE | 4408831 A1 | * | 9/1995 | ............ F16D 3/385 |
| DE | 102005016215 A1 | * | 10/2006 | ............ F16D 3/385 |
| DE | 102014215000 A1 | * | 2/2016 | ............ F16D 3/385 |
| DE | 202016106897 U1 | * | 2/2017 | ............ F16D 3/385 |
| DE | 102018207056 A1 | | 11/2018 | |

* cited by examiner

*Primary Examiner* — Josh Skroupa
(74) *Attorney, Agent, or Firm* — J-TEK LAW PLLC; Scott T. Wakeman; Mark A. Ussai

(57) ABSTRACT

A cup assembly for a pin of a universal joint bearing includes a cup, a first seal ring attached to the cup, and a second seal ring. The first seal ring includes an elastic element and a spring element configured to preload the elastic element toward the pin, the second seal ring includes a dimensionally stable seal section that is configured to sealingly interact with the pin, and the second seal ring is connected to the cup either directly, or via the elastic element or via an elastic retainer. Also a method of installing the cup assembly.

17 Claims, 4 Drawing Sheets

CUP ASSEMBLY FOR A UNIVERSAL JOINT BEARING

CROSS-REFERENCE

This application claims priority to German patent application no. 10 2020 130 310.6 filed on Nov. 17, 2020, the contents of which are fully incorporated herein by reference.

TECHNOLOGICAL FIELD

The present disclosure is directed to a seal assembly for a pin of a universal joint bearing and to a method for installing the assembly.

BACKGROUND

Universal joints are conventionally used to provide an angularly movable coupling between two shafts. This is required, for example, with Cardan shafts in motor vehicles. In such a universal joint, a universal joint bearing is used that is defined by a pin that forms the inner ring of the universal joint bearing and a cup that forms an outer ring of the universal joint bearing. As in other bearings, rolling elements that are disposed between the cup and the pin are sealed in order to keep wear of the bearing low. It has been necessary in conventional universal joint bearings to bring seals onto the pin and cup separately, which requires a complex installation process at the site where the assemblies are to be used.

SUMMARY

It is therefore an aspect of the present disclosure to provide a simple cup assembly that can be installed as a whole on a pin in a universal joint bearing.

The cup assembly for installing on a pin of the universal joint bearing includes a cup, a first seal ring that is attached to the cup, and a second seal ring. Both the first seal ring and the second seal ring serve to seal a rolling space in which rolling elements of the universal joint bearing are disposed. The rolling elements are disposed between the cup and the pin and enable a relative movement between the cup and the pin. For this purpose the first seal ring includes an elastic element that is configured to sealingly interact with the cup and the pin. Furthermore, the first seal ring includes a spring element that is configured to preload, in operation, the elastic element of the first seal ring toward the pin. The presence of the spring element prevents a reduction of a seal effect between the elastic element and the pin when forces act on the elastic element. In particular, the spring element counteracts these forces. The second seal ring includes a dimensionally stable seal section, or is comprised of such a dimensionally stable seal section, which is configured to sealingly interact with the pin in operation. The dimensionally stable seal section can be manufactured from a non-elastomeric material, for example, metal or plastic.

In order to now provide a cup assembly that can be installed as a whole on a pin of the universal joint bearing, the second seal ring is either directly connected to the cup or connected via an elastic retaining element to the first seal ring or the cup. The elastic retaining element can be provided on the second seal ring or the first seal ring, wherein in the latter case the elastic retaining element is formed by the elastic element of the first seal ring.

Due to this connection of the second seal ring to the cup, the second seal ring can be connected, at least for installation, to the cup and/or to the first seal ring, and be installed therewith as a single assembly (comprised of cup, first seal ring, and second seal ring) onto the pin.

The elastic retaining element is preferably comprised of an elastomer. Alternatively the elastic retaining element can be comprised of another material that has similar properties to an elastomer.

Depending on the type of the connection of the second seal ring to the cup or to the first seal ring, during installing the second seal ring is pushed onto the pin and attached there by friction contact or press-fit, or remains connected to the cup in operation even after installation.

By means of this cup assembly a simple installation onto the pin of the assembly that includes the cup, the first seal ring, and the second seal ring is possible.

According to one embodiment, the elastic retaining element is formed by elastomeric lips that are provided on the second seal ring and that contact a radially outer surface of the cup. Due to these elastomeric lips, a friction contact is produced between the second seal ring and the radially outer surface of the cup, wherein the friction contact is sufficient such that the assembly can be transported with all elements and installed on the pin. During installation, the second seal ring is pushed onto the pin, whereby it is connected to the pin. In operation the second seal ring thus rotates relative to the first seal ring and the cup. Due to this relative rotation, the elastomeric lips are abraded against the second seal ring. However, since it is an elastomeric material, i.e., soft material, such as, for example, rubber, this abraded, soft material does not lead to any impairment of the function of the universal joint bearing.

A gap can be provided between a radially outer surface of the cup and the second seal ring. This gap preferably has a course extending radially and axially obliquely outward, so that dirt that penetrates into the gap is pumped outward by the centrifugal forces that arise in the universal joint in operation.

According to a further embodiment, the second seal ring is disposed on the cup by a press-fit. In this case the second seal ring is not pushed onto the pin during installation, but rather remains on the cup even after installation and in operation. This represents a particularly good attaching of the second seal ring to the cup and thus leads to a very stable assembly that can be installed on the pin.

According to a further embodiment, the second seal ring forms a gap seal with a radial outer surface of the pin. Since in this case the second seal ring is not pushed onto the pin, the second seal ring can form a gap seal or labyrinth seal with the pin. A gap of this gap seal preferably extends in a direction extending obliquely radially and axially, whereby dirt that penetrates into the gap seal is pumped out of the gap seal by centrifugal forces.

According to a further embodiment, the elastic element of the first seal ring contacts, as elastic retaining element, the second seal ring against a radially inner surface of the second seal ring, and/or against a surface of a section of the second seal ring, which surface, viewed in an axial cross-section, extends radially. The contacting of the elastic element and of the second seal ring leads to a sealing between the first and the second seal ring. On the other hand this serves to obtain a friction contact between the second seal ring and the first seal ring due to the elastic element (for example, in the form of elastomeric lips). Due to this friction contact, the second seal ring is retained against the first seal ring during installation, and the assembly can be installed as a whole on the pin.

According to a further embodiment, the first seal ring includes a metal ring that, viewed in an axial cross-section, is essentially S-shaped and is disposed on the cup, wherein the elastic element surrounds the metal ring on one or both ends in the axial cross-section. Due to this design of the metal ring, the elastic element can be particularly well anchored against the metal ring.

Alternatively the elastic element of the first seal ring can be disposed at least partially between the metal ring and the cup in order to thereby generate an additional seal effect at this connecting point.

The elastic element of the first seal ring can include a first seal lip which, in an installed state, contacts the pin. For example, the first seal lip of the first seal ring can contact a radially outer surface of the pin in a region that is a straight extension of a raceway of the pin for rolling elements of the universal joint bearing. In particular due to this first seal lip a sealing can be provided against an entry of dirt. For example, the first seal lip has a radial orientation, or can have a radially and axially extending extension. In particular, as described above, the seal lip is preloaded toward the pin by a spring element.

According to a further embodiment, the elastic element of the first seal ring directly contacts the second seal ring in the axial direction. In this case the elastic element can abut full-surface against the second seal ring in order to thus ensure a sealing between the first seal ring and the second seal ring. Alternatively the elastic element of the first seal ring can include a second seal lip that contacts the second seal ring in the axial direction. A sealing, in particular with respect to an entry of dirt from outside, between the first seal ring and the second seal ring is also achieved by such a seal lip.

According to a further embodiment, the first seal ring includes a third seal lip that contacts against a radially outer surface of the pin and faces toward the rolling elements. In particular a sealing of the rolling elements against an outflow of lubricant is achieved by this third seal lip. Since the third seal lip faces toward the rolling elements, lubricant that escapes from the region of the rolling elements presses against the third seal lip, thus pressing it against the pin, and thus seals against an escape of lubricant.

According to a further aspect, a method is proposed for installing an assembly as described above on a pin. The second seal ring is connected directly or indirectly via an elastic retaining element to the first seal ring or the cup, and is installed, together with the first seal ring or the cup, on the pin. Here, as described above, the elastic retaining element can be attached to the first seal ring or the second seal ring and correspondingly be in contact with the second seal ring or the cup. In operation the elastic retaining element is subjected to wear due to this contact. However, this wear is configured such that it on the one hand is harmless for the bearing, and on the other hand generates, after a short period, a gap that prevents further wear and simultaneously forms a further labyrinth seal.

If the second seal ring is connected via an elastic retaining element to the first seal ring or the cup, the preinstalled second seal ring forms a press connection with the pin by axial pushing onto the pin. If the second seal ring is directly connected to the cup, for example, by a press connection, the preinstalled second seal ring forms a gap seal with the pin by axial pushing of the assembly onto the pin.

According to another aspect of the disclosure, the second seal ring has an annular central portion having a radially inner end and a radially outer end, a first circumferential flange extending from the radially outer end axially in a first direction over a portion of the cup and a second circumferential flange extending from the radially inner end axially in a second direction opposite the first direction over a portion of the pin. A free end of the first circumferential flange is axially spaced from a wall of the cup by a gap, and a circumferential air space extends between the first circumferential flange and the cup from the gap to the first seal ring.

According to a further aspect, a method is disclosed that includes providing a cup assembly as described above and inserting a pin into the cup assembly until the elastic element makes contact with a first outer surface of the pin having a first diameter and the second seal ring overlies a second outer surface of the pin having a second diameter greater than the first diameter.

Further advantages and advantageous embodiments are specified in the description, the drawings, and the claims. Here in particular the combinations of features specified in the description and in the drawings are purely exemplary, so that the features can also be present individually or combined in other ways.

In the following the invention is described in more detail using the exemplary embodiments depicted in the drawings. Here the exemplary embodiments and the combinations shown in the exemplary embodiments are purely exemplary and are not intended to define the scope of the invention. This scope is defined solely by the pending claims.

DETAILED DESCRIPTION

In the following, identical or functionally equivalent elements are designated by the same reference numbers.

Figure 1:
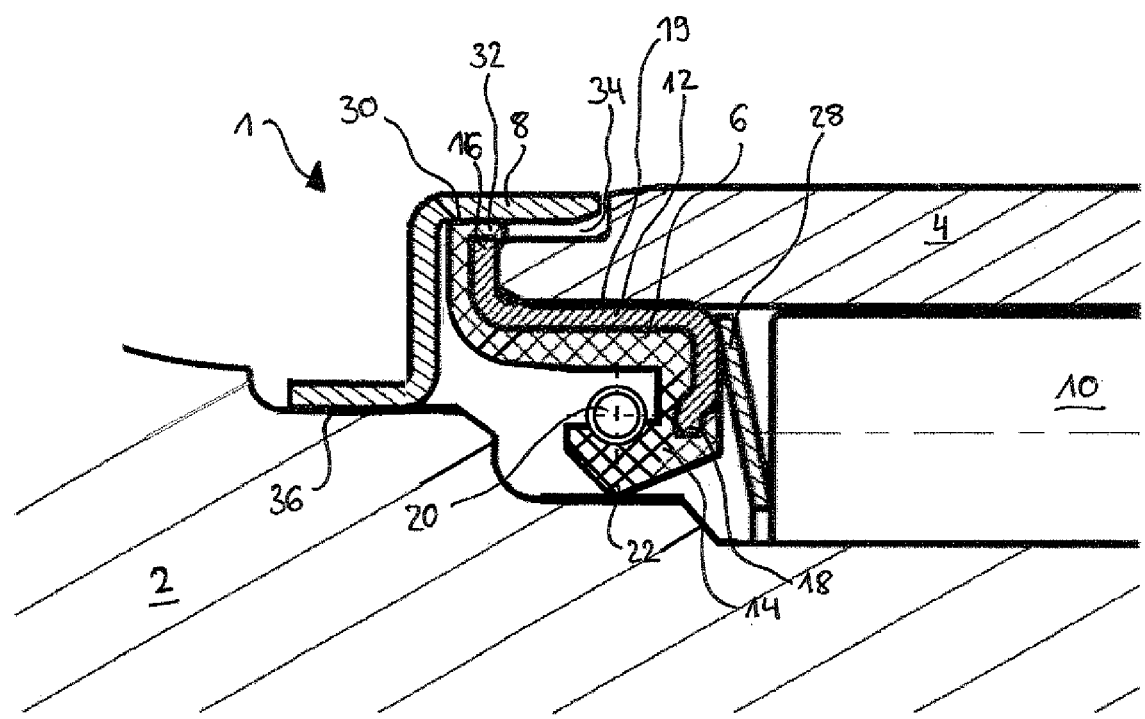
FIG. 1 is a sectional view of a cup assembly for a universal joint bearing according to a first embodiment of the present disclosure.

FIG. 1 shows a cup assembly 1 that is configured to be pushed onto a pin 2 of a universal joint. The assembly 1 includes a cup 4, a first seal ring 6, and a second seal ring 8. The first seal ring 6 and the second seal ring 8 serve in combination to seal a rolling space in which rolling elements 10 of the universal joint bearing are disposed. The rolling elements 10 are disposed between the cup 4 and the pin 2 and make possible a relative movement between cup 4 and pin 2. The assembly 1 is configured as a single component that can be pushed as a whole onto the pin 2. As soon as the assembly 1 is pushed onto the pin 2, the second seal ring 8 sealingly interacts with the pin 2.

The first seal ring 6 is comprised of an S-shaped metal ring 12 and an elastic element 14. The elastic element 14 can be compression-molded or vulcanized onto the metal ring 12. It surrounds a first end 16 and a second end 18 of the metal ring 12. The metal ring 12 is attached in a friction-fit manner to a radially inner surface 19 of the cup 4.

A spring element, for example, a radial shaft spring 20, is provided on the elastic element 14 in order to preload it against the pin 2 in operation. The radial shaft spring 20 can be a garter spring or the like. In the embodiment shown here, the elastic element 14 of the first seal ring 6 includes a seal lip 22 that extends radially toward the pin 2. This seal lip 22 serves on the one hand for sealing against an entry of dirt from outside, and on the other hand for sealing against a lubricant discharge outward from the region of the rolling elements.

In operation, forces act from the cup 4 toward the seal lip 22. In order to ensure a contact of the seal lip 22 with the pin 2 under the effect of such forces, even in operation, the radial shaft spring 20 acts in the opposite direction, i.e., in this embodiment the radial shaft spring 20 serves to preload the seal lip 22 with respect to the pin 2.

A cup spring 28 is provided between the first seal ring 6 and the rolling elements 10. This serves to exert a precisely defined pressure toward the rolling elements 10 in order to prevent or reduce a skewing of the rolling elements 10 and thereby achieve a longer service life and better performance of the universal joint bearing.

Before and during installation assembly 1 on the pin 2, the part 32 of the elastic element 14 that surrounds the first end 16 of the metal ring 12 contacts the second seal ring 8 against a radially inner surface 30 of the second seal ring 8. Due to this contact, the second seal ring 8 is retained against the first seal ring 6 in a friction-fit manner during installation. In addition, a seal effect between the first and the second seal ring 6, 8 is achieved by the contacting part 32 of the elastic element 14.

In operation, this contacting part 32 can abrade. However, since on the one hand a sealing by the seal lip 22 is present, and on the other hand a gap 34 is present between the first seal ring 6 and the cup 4, such abrasion particles cannot penetrate into the universal joint bearing, but rather are pumped outward through the gap 34 due to centrifugal forces.

The second seal ring 8 is comprised of a dimensionally stable seal section that is configured to sealingly interact with the pin 2 in operation. The dimensionally stable seal section can be manufactured from a non-elastomeric material, for example, metal or plastic.

When the assembly 1 is pushed as a whole onto the pin 2, the second seal ring 8 is attached to a radially outer surface 36 of the pin 2 in a friction-fit manner or by press-fit. Alternatively this connection can also be realized by an interference fit, for example, by a caulking into a corresponding depression of the pin 2.

Figure 2:
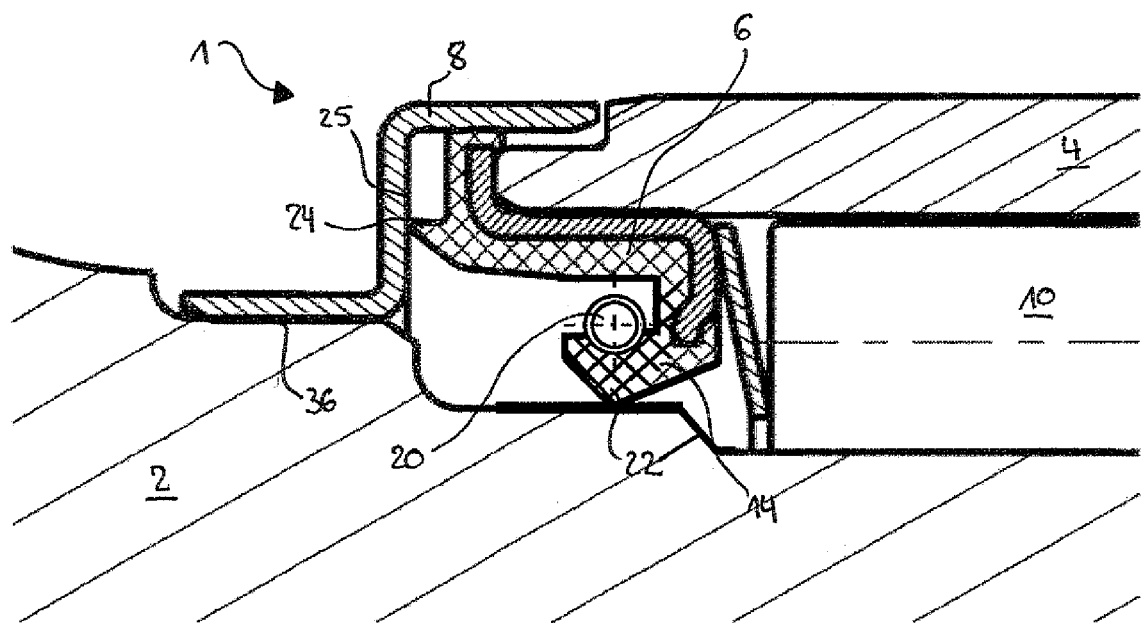
FIG. 2 is a sectional view of a cup assembly for a universal joint bearing according to a second embodiment of the present disclosure.

A second embodiment of the assembly 1 is shown in FIG. 2. This embodiment differs from FIG. 1 in that the first seal ring 6 includes a second seal lip 24 in addition to the first seal lip 22. This second seal lip 24 extends axially and contacts the second seal ring 8 against an axially inner surface 25. An improved sealing against entry of dirt from outside is ensured by the second seal lip 24.

Figure 3:
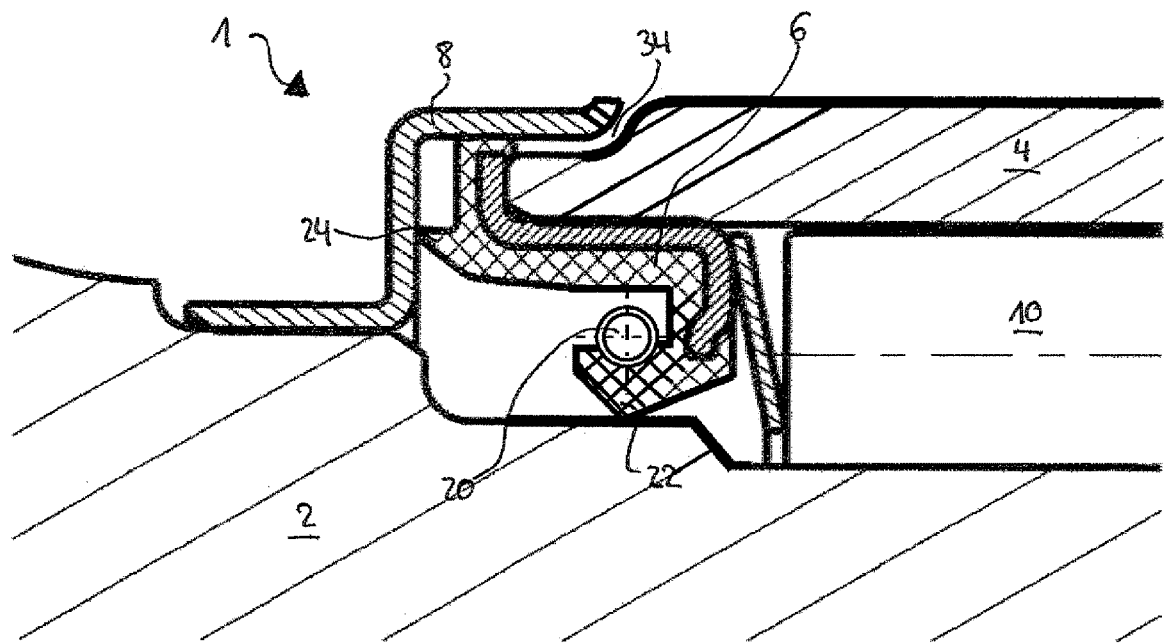
FIG. 3 is a sectional view of a cup assembly for a universal joint bearing according to a third embodiment of the present disclosure.

FIG. 3 shows a third embodiment of the assembly 1. This differs from the embodiment of FIG. 2 in that the gap 34 between the second seal ring 8 and the cup 4 initially extends axially and then bends away radially outward. Due to this course, foreign materials, such as dirt, dust, etc. that penetrate between the second seal ring 8 and the cup 4 can be pumped outward particularly well by centrifugal forces arising in operation.

Figure 4:
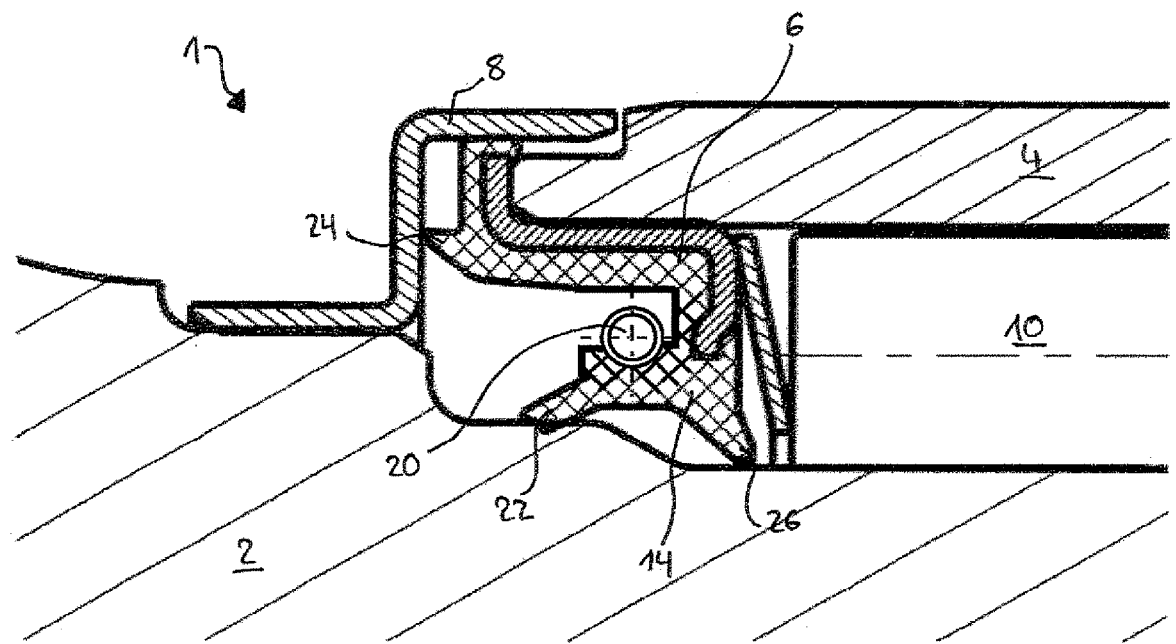
FIG. 4 is a sectional view of a cup assembly for a universal joint bearing according to a fourth embodiment of the present disclosure.

FIG. 4 shows a fourth embodiment of the assembly 1 that differs from the embodiment of FIG. 2 in that the first seal ring 6 includes three seal lips 22, 24, 26. The first seal lip 22 extends in an axial and radial direction obliquely toward the pin 2 and abuts against it in order to protect against contaminants. The second seal lip 24 abuts axially against the second seal ring 8 and also serves for sealing against contaminants. The third seal lip 26 also extends in an axial and radial direction and abuts against the pin 2; however, in contrast to the seal lip 24, it is directed toward the rolling elements 10. This has the advantage that in operation, lubricant that is located in the bearing and moves from the rolling elements 10 toward the seal lip 26, presses against the seal lip 26 and thereby reinforces the seal effect of the seal lip 26. The seal lip 26 thus serves above all for sealing against an escape of lubricating grease.

Figure 5:
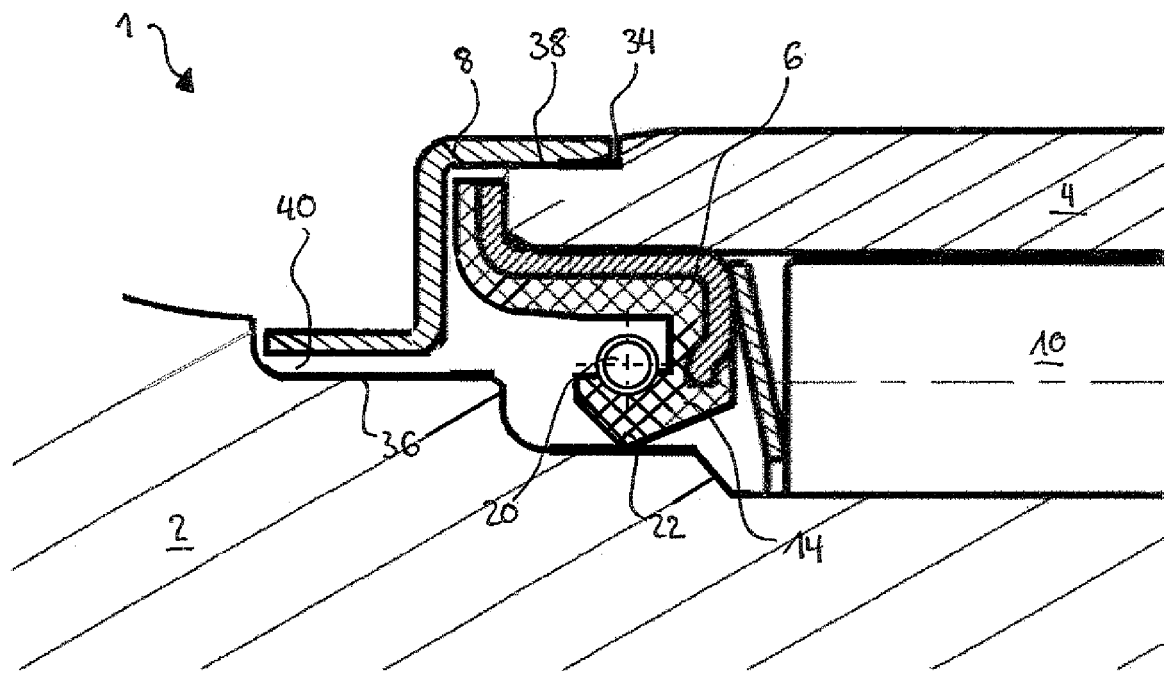
FIG. 5 shows a sectional view of a cup assembly for a universal joint bearing according to a fifth embodiment of the present disclosure.

FIG. 5 shows a fifth embodiment of the assembly 1 that differs from the assembly of FIG. 1 in that the second seal ring 8 is disposed on a radially outer surface 38 of the cup 4 by press-fit. The second seal ring 8 is thereby permanently connected to the cup 4, i.e., even after installation. A friction contact between the elastic element 14 of the first seal ring 6 and the second seal ring 8, in order to retain it against the first seal ring 6 in a friction fit manner during installation, is therefore not provided.

In addition, in this embodiment a gap or labyrinth seal is formed by the second seal ring 8 and the pin 2. Here a gap 40 between the second seal ring 8 and the radially outer surface 36 of the pin 2 is provided. During operation, contaminants that penetrate into the assembly 1 are pumped outward again through this gap 40 due to centrifugal forces.

Figure 6:
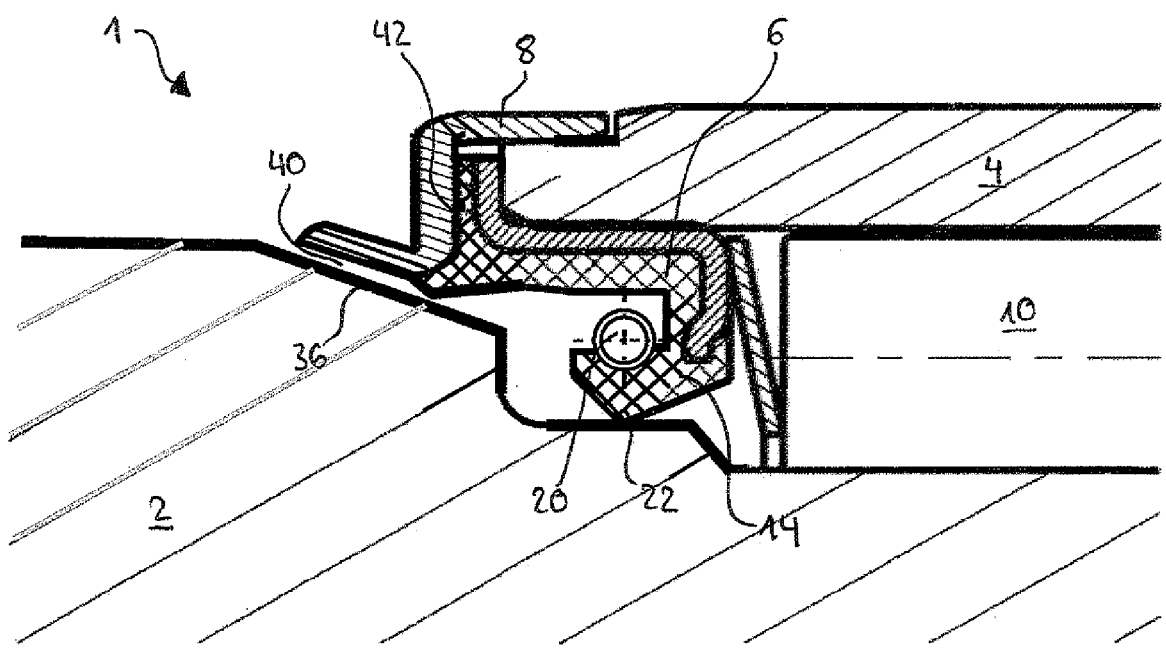
FIG. 6 shows a sectional view of a cup assembly for a universal joint bearing according to a sixth embodiment of the present disclosure.

This effect can be reinforced further when the radially outer surface 36 of the pin 2 extends radially and axially obliquely as is shown in FIG. 6. Furthermore, a seal effect between the first and the second seal ring 6, 8 can be improved when the elastic element 14 of the first seal ring 6 contacts the second seal ring 8 against a contact surface 42. Alternatively thereto, the elastic element 14 can have an additional sealing contact directly on the pin 2, preferably in the region of the seal gap 40. In this way contaminants can be prevented from penetrating between the two seal rings 6, 8.

Figure 7:
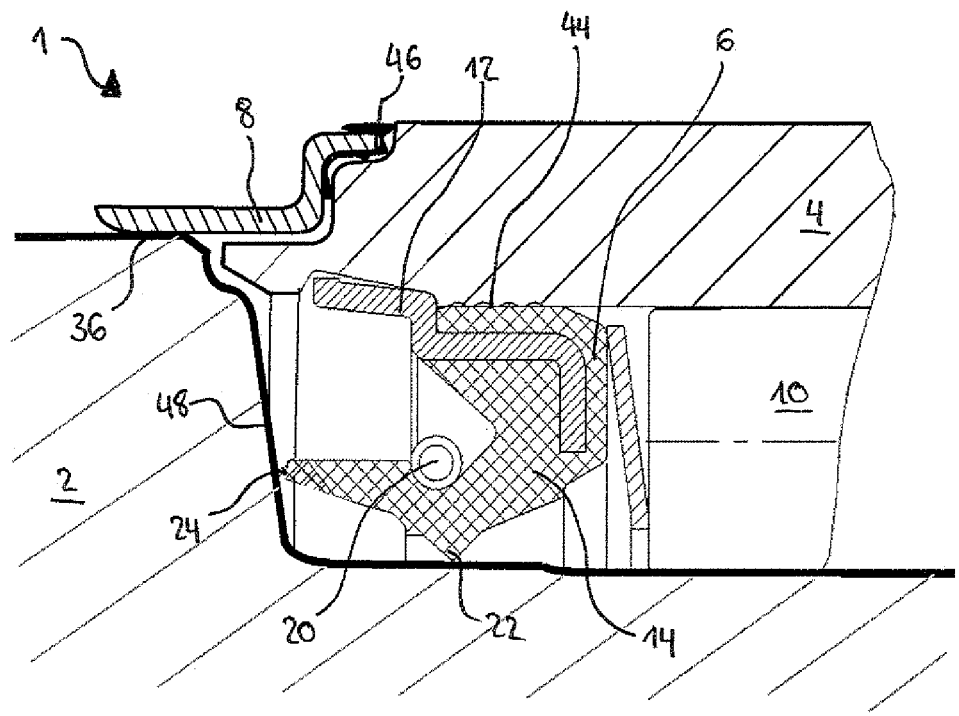
FIG. 7 shows a sectional view of a cup assembly for a universal joint bearing according to a seventh embodiment of the present disclosure.

A seventh embodiment of the assembly 1 is shown in FIG. 7. This differs from the preceding embodiments in that the metal ring 12 of the first seal ring 6 is attached to the cup 2 in an interference-fit manner and that the elastic element 14 contacts the cup 4 against a contact surface 44 and realizes a further sealing against it by a friction contact. Here the second seal lip 24 of the first seal ring 6 does not seal against the second seal ring 8 but rather against an essentially radially extending surface 48 of the pin 2.

The second seal ring 8 includes an elastic retainer in the form of elastomeric lips 46 that contact the cup 4 prior to and during installing of the assembly 1 on the pin 2. Due to the contact the second seal ring 8 is retained against the cup 4 in a friction-fit manner during installation. In addition, a seal effect is achieved between the second seal ring 8 and the cup 4 by the elastomeric lips 46. When the assembly 1 is pushed as a whole onto the pin 2, the second seal ring 8 is attached to a radially outer surface 36 of the pin 2 in a friction-fit manner or by press-fit.

Figure 8:
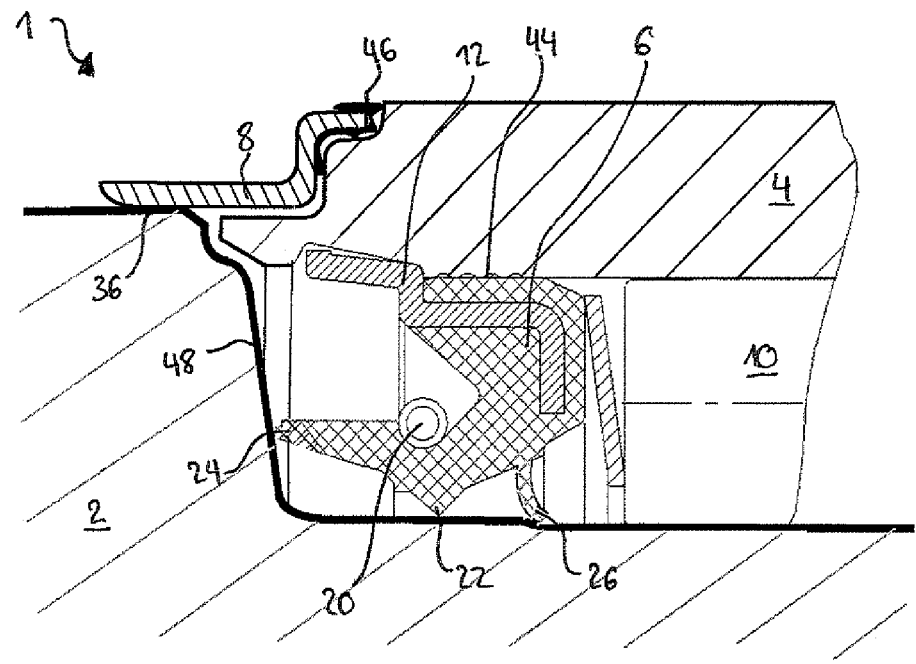
FIG. 8 shows a sectional view of a cup assembly for a universal joint bearing according to an eighth embodiment of the present disclosure.

A sealing effect of the assembly 1 can be further strengthened when the first seal ring 6 includes a third seal lip 26, as is shown in FIG. 8. As is already described above with reference to FIG. 4, the third seal lip 26 extends in an axial and radial direction and is directed toward the rolling elements 10. This has the advantage that in operation, lubricant that is located in the bearing and moves from the rolling elements 10 toward the seal lip 26, presses against the seal lip 26 and thereby reinforces the seal effect of the seal lip 26.

Due to the above-described assembly a simple unit is thus obtained that can be installed as a whole (i.e. comprised of cup, first seal ring, and second seal ring) on a pin of a universal joint.

Representative, non-limiting examples of the present invention were described above in detail with reference to the attached drawings. This detailed description is merely intended to teach a person of skill in the art further details for practicing preferred aspects of the present teachings and is not intended to limit the scope of the invention. Furthermore, each of the additional features and teachings disclosed above may be utilized separately or in conjunction with other features and teachings to provide improved seal assembly for a universal joint bearing.

Moreover, combinations of features and steps disclosed in the above detailed description may not be necessary to practice the invention in the broadest sense, and are instead taught merely to particularly describe representative examples of the invention. Furthermore, various features of the above-described representative examples, as well as the various independent and dependent claims below, may be combined in ways that are not specifically and explicitly enumerated in order to provide additional useful embodiments of the present teachings.

All features disclosed in the description and/or the claims are intended to be disclosed separately and independently from each other for the purpose of original written disclosure, as well as for the purpose of restricting the claimed subject matter, independent of the compositions of the features in the embodiments and/or the claims. In addition, all value ranges or indications of groups of entities are intended to disclose every possible intermediate value or intermediate entity for the purpose of original written disclosure, as well as for the purpose of restricting the claimed subject matter.

REFERENCE NUMBER LIST

1 Assembly
2 Pin
4 Cup
6 First seal ring
8 Second seal ring
10 Rolling element
12 Metal ring
14 Elastic element
16 First end
18 Second end
19 Radially inner surface of the cup
20 Radial shaft spring
22 First seal lip
24 Second seal lip
25 Axially inner surface of the second seal ring
26 Third seal lip
28 Cup spring
30 Radially inner surface of the second seal ring
32 Contacting part
34 Gap
36 Radially outer surface of the pin
38 Radially outer surface of the cup
40 Gap
42 Contacting surface
44 Contacting surface
46 Elastomeric lips
48 Radially extending surface of the pin

What is claimed is:

1. A cup assembly for a pin of a universal joint bearing, comprising:
a cup,
a first seal ring attached to the cup, and
a second seal ring,
wherein the first seal ring includes an elastic element and a spring element configured to preload the elastic element toward the pin,
wherein the second seal ring includes a non-elastomeric seal section configured to sealingly interact with the pin without an intervening body of elastomeric material,
wherein the second seal ring is connected to the cup,
wherein the first seal ring includes a metal ring that is substantially S-shaped in an axial cross-section and that directly contacts the cup and that has a radially inner end and a radially outer end, and
wherein the elastic element covers the radially inner end and/or the radially outer end of the metal ring.

2. The cup assembly according to claim 1,
wherein the second seal ring is connected directly to the cup.

3. The cup assembly according to claim 1, wherein the second seal ring is connected to the cup by a press-fit.

4. The cup assembly according to claim 3, wherein the second seal ring forms a gap seal with a radially outer surface of the pin.

5. The cup assembly according to claim 1, wherein the elastic element of the first seal ring includes at least one seal lip configured to contact the pin.

6. The cup assembly according to claim 5,
wherein the pin includes a first radially outer raceway surface configured to support a plurality of rollers between the raceway surface and the cup, and
wherein the at least one seal lip comprises a first seal lip in contact with the raceway surface.

7. The cup assembly according to claim 6,
wherein the pin includes a second radially outer surface having a diameter greater than the first radially outer surface, and
wherein the at least one seal lip comprises a second seal lip in contact with the second radially outer surface.

8. The cup assembly according to claim 1,
wherein the second seal ring is formed from metal.

9. A method comprising:
providing the cup assembly according to claim 1,
inserting the pin into the cup assembly until the elastic element makes contact with a first outer surface of the pin having a first diameter and the second seal ring overlies a second outer surface of the pin having a second diameter greater than the first diameter.

10. The method according to claim 9,
including forming a press fit between the second seal ring and the pin.

11. The cup assembly according to claim 1,
wherein the non-elastomeric seal section is formed of metal.

12. A cup assembly for a pin of a universal joint bearing, comprising:

a cup, a first seal ring attached to the cup, and a second seal ring, wherein the first seal ring includes an elastic element and a spring element configured to preload the elastic element toward the pin, wherein the second seal ring includes a non-elastomeric seal section configured to sealingly interact with the pin without an intervening body of elastomeric material, wherein the second seal ring is connected to the cup via the elastic element, wherein the second seal ring does not contact a radially outer surface of the cup, wherein the elastic element of the first seal ring contacts the second seal ring against a radially inner surface of the second seal ring and against an axially facing surface of a radially extending section of the second seal ring, wherein the first seal ring includes a metal ring that is substantially S-shaped in an axial cross-section and that directly contacts the cup and that has a radially inner end and a radially outer end, wherein the elastic element covers the radially inner end and the radially outer end of the metal ring, and wherein the elastic element of the first seal ring includes at least one seal lip in contact with the pin.

13. A cup assembly for a pin of a universal joint bearing, comprising:

a cup, a first seal ring attached to the cup, and a second seal ring, wherein the first seal ring includes an elastic element and a spring element configured to preload the elastic element toward the pin, wherein the second seal ring includes a non-elastomeric seal section configured to sealingly interact with the pin without an intervening body of elastomeric material, wherein the second seal ring is connected to the cup wherein the second seal ring has an annular central portion having a radially inner end and a radially outer end, a first circumferential flange extending from the radially outer end axially in a first direction over a portion of the cup and a second circumferential flange extending from the radially inner end axially in a second direction opposite the first direction over a portion of the pin, wherein a free end of the first circumferential flange is axially spaced from a wall of the cup by a gap, and wherein a circumferential air space extends between the first circumferential flange and the cup from the gap to the first seal ring.

14. The cup assembly according to claim 13, wherein the second seal ring is connected to the cup via the elastic element.

15. The cup assembly according to claim 13, wherein the elastic element of the first seal ring contacts the second seal ring against a radially inner surface of the second seal ring and/or against an axially facing surface of the annular central portion of the second seal ring.

16. The cup assembly according to claim 13, wherein the elastic element of the first seal ring directly contacts an axially facing surface of the annular central portion of the second seal ring.

17. The cup assembly according to claim 13, wherein the elastic element of the first seal ring includes a first seal lip that contacts a radially outer surface of the pin and a second seal lip that contacts an axially facing surface of the annular central portion of the second seal ring.

* * * * *